United States Patent
Andersen et al.

(10) Patent No.: US 7,205,529 B2
(45) Date of Patent: Apr. 17, 2007

(54) LASER MIRROR VISION

(75) Inventors: Kristinn Andersen, Hafnarfjordur (IS); Kristian Hallvardsson, Kopavogur (IS); Sigurbjorn Narfason, Reykjavik (IS); Vidar Erlingsson, Gardabaer (IS)

(73) Assignee: Marel HF, Gardabaer (IS)

( * ) Notice: Subject to any disclaimer, the term of this patent is extended or adjusted under 35 U.S.C. 154(b) by 500 days.

(21) Appl. No.: 10/470,775

(22) PCT Filed: Feb. 1, 2002

(86) PCT No.: PCT/IS02/00004

§ 371 (c)(1),
(2), (4) Date: Dec. 29, 2003

(87) PCT Pub. No.: WO02/061368

PCT Pub. Date: Aug. 8, 2002

(65) Prior Publication Data

US 2004/0114153 A1 Jun. 17, 2004

Related U.S. Application Data

(60) Provisional application No. 60/265,876, filed on Feb. 5, 2001.

(30) Foreign Application Priority Data

Feb. 1, 2001 (IS) .......................... 5838

(51) Int. Cl.
*G01B 11/14* (2006.01)
*G01B 11/22* (2006.01)
*G01N 21/00* (2006.01)

(52) U.S. Cl. .................. 250/223 R; 250/226; 356/600; 356/601; 356/608; 356/625; 356/627; 356/237.2; 345/419

(58) Field of Classification Search ...................... None
See application file for complete search history.

(56) References Cited

U.S. PATENT DOCUMENTS

| 4,825,068 A | | 4/1989 | Suzuki et al. |
| 5,184,733 A | | 2/1993 | Arnarson et al. |
| 5,325,470 A | * | 6/1994 | Sumino et al. .............. 345/419 |
| 5,689,629 A | * | 11/1997 | Lee ............................ 345/427 |

FOREIGN PATENT DOCUMENTS

| DE | 3528047 A1 | 2/1987 |
| DE | 3805455 A1 | 8/1989 |
| DE | 19514692 A1 | 10/1996 |

* cited by examiner

Primary Examiner—Layla G. Lauchman
Assistant Examiner—Juan D. Valentin, II
(74) Attorney, Agent, or Firm—Nixon & Vanderhye P.C.

(57) ABSTRACT

The present invention relates to a method and an apparatus for determining a three dimensional image of the a moving object by means of reflecting means such as mirrors and a planar beam of light such as a laser light. As the object enters the light a two dimensional image of the object is captured, wherein the image comprises both the reflection of the beam of light from the object and also the reflection from the reflecting means. By transformation procedure a two dimensional image is transformed to a two dimensional object image and based on plurality of such images a three dimensional image is defined from which the volume can be calculated. This can be used to determine the weight distribution of the object, which is important for portioning.

21 Claims, 10 Drawing Sheets

LASER MIRROR VISION

This application is the U.S. national phase of international application PCT/IS02/00004 filed 1 Feb. 2002, which designated the U.S.

This application also claims the benefit of the filing date of U.S. provisional patent application Ser. No. 60/265,876, filed 5 Feb. 2001.

FIELD OF THE INVENTION

The present invention relates to a method and an apparatus for determining a three dimensional image of the a moving object by means of reflecting means such as mirrors and a planar beam of light such as a laser light.

DESCRIPTION OF THE PRIOR ART

Determination of a three dimensional image of conveyed food items is an important task for the food industry. When the processing comprises grading objects by form, size and weight, information regarding the volume and the shape of the food item is necessary.

U.S. Pat. No. 5,184,733 describes a method and apparatus for determining the volume, form and weight of objects. A linescan camera records a top view of the object and at the same time records a profile view of the object through a mirror positioned on a fixed support at the side of a conveyor. From these data the width and the height of the object is determined. Accordingly, the composition image of the object consists of many cross-sections, with the width and the maximum thickness of the object being measured in each cross-section.

In U.S. Pat. No. 4,979,815 a range imaging system is presented for of producing a range image of an area of the surface of an object. This is utilized by projecting a substantially planar beam of light onto an object surface to illuminate the surface along a light stripe. The illuminated light beam is viewed and converted into an image generating the range image of the object. A 3-D image of the object is formed by moving the object while it is scanned.

The problem with the solution describe in U.S. Pat. No. 5,184,733 is how inaccurate it is. By determining only the width and height of the object, the errors can be very height, especially when the object has irregular structure.

This problem is only partly solved in U.S. Pat. No. 4,979,815, by viewing illuminated light beam on the surface of the object. By measuring only the top view and the profile image the volume estimation can also be inaccurate, specially when the objects have a very irregular shape. By using a planar beam of light situated above the moving object only the visible part of the object facing the capturing means can be detected, form which a two dimensional image will be formed. Parts of the object such as parts of the surface that is not in line of sight from the viewpoint of the capturing means as well as all the downwardly facing parts of the object will not be visible for the capturing means as will therefore appear as blanks in the captured image. This causes an increase in uncertainty in the measurement.

Accordingly, there is a need for further improvements in such volume determination of objects being moved.

GENERAL DESCRIPTION OF THE INVENTION

It is an object of the present invention to increase the accuracy in the determination of a three dimensional image of a moving object by means of additionally detecting the areas of the object which are not visible in the direct view.

According to the first aspect the present invention relates to a method for determining a three dimensional image of an object being conveyed by a moving means through a planar beam of light the method comprising the steps of, repetitively a) capturing a two dimensional image of the object with a capturing means, the captured image comprising a scan element based on a reflection of the planar beam of light from the object and a scan element based on a reflection of the planar beam of light from at least one reflecting means, b) dividing the two dimensional image into at least two image domains, wherein one image domain comprises a reflection of the planar beam of light from the object and at least one image domain comprises a reflection of the planar beam of light from at least one reflecting means, and c) transforming the image domains into a two dimensional mutual object domain by means of a transformation procedure, while the object is being subjected to the planar beam of light and based on the plurality of the two dimensional image in the object domain a three dimensional image is defined.

The conveying means can be a conveyor belt and the planar beam of light may be a laser and a cylindrical lens or a vibrating mirror for producing a planar beam of light, which is situated above the moving object and wherein the plane of the beam light is perpendicular to the moving direction of the object. As the object enters the light, the light is both reflected from the object to the capturing means, and from the reflecting means to the object, wherein the reflection comprises a plurality of scan elements. The frequency of capturing a two dimensional image could be controlled by a computer, wherein when no profile image is detected the image processing is minimal and the scan frequency is maximal, yielding maximal resolution for locating the edge of the object that first crosses the light. As soon as the object enters the light the amount of processing per scan line increases and the scan frequency can be decreased or set to a desired value.

This image processing is repeated while the object is being subjected to the planar beam of light. Based on a plurality of such two dimensional images in the object domain, a three dimensional image is defined and the volume can be determined. By varying the processing rate the resolution of the three dimensional image is varied. High processing rate would lead to high resolution of the images and conversely. By weighing the object the mass distribution can furthermore be determined. This is an important feature for batching, wherein the mass distribution is used for cutting the object in accordance to predefined criteria, wherein said criteria are based on the speed of the moving means and the mass distribution.

Additional features can be determined, such as the roughness of the surface of the object, wherein the irregularity of the contour line of the two-dimensional profile image is used as an indicator of the roughness, wherein a smooth surface is reflected in a irregular contour line. Furthermore, by capturing colours information regarding features such as fat and muscle can be determined. The roughness, colour, reflectivity and light absorption may also be related to the condition of the material such as porosity, chemical composition or water content.

The reflecting means may comprise at least one first side mirror, which may be positioned parallel to the moving direction of the object and in the plane of the planar beam of light so that the side view image of the object can be detected and at least one rear back mirror. In one embodiment the number of said at least one first side mirrors is two, positioned parallel to the moving direction along with one rear back mirror situated at a location approximately opposite to the capturing means, on the other side of the light beam plane. The angle between the plane of the back mirror and the planar beam of light would be such that the reflection of the light which is reflected opposite to the capturing means to the back mirror would be captured by the capturing means. The number of capturing means can however be different and is not restricted to use of only one rear back mirror or only two side mirrors.

The side mirror enables viewing the side image parts of the object, which would otherwise not be detectable from the capturing means, such as downwardly facing parts. On the other hand surface parts that are not in line of sight for the capturing means can be captured through the rear back mirror. Therefore the images that the capturing means captures is the reflection form the object, the reflected image from the side mirror and the reflected image from the back rear window.

In order to increase the efficiency in the performance in the capturing means, such as the resolution, at least one second side mirror could be situated between the at least one first side mirror and the at least one back rear mirror. In this embodiment the purpose of the at least one first side mirror is to reflect the laser beam underneath the side of the object towards the least one second side mirror. The at least one second side mirror would be positioned in such a way to decrease the viewing angle of the detecting means and therefore increase the performance in the capturing means. Instead of capturing the side view image from the at least one first side mirror, the side view image will be viewed in the at least one second side mirror and captured in the capturing means.

One embodiment of such arrangement is to use two first side mirrors and two second side mirrors with only one back rear window, wherein the distance between the two second side mirrors is shorter that between the first side mirrors which allows decreasing the viewing angle of the capturing means.

Both these embodiments would preferably be assembled and mounted as one unit in a fixed position, i.e. the light source, the capturing means and the reflecting means.

The capturing means can for example be a matrix sensor, such as a CCD or a CMOS semiconductor sensor. The captured images are in an image domain, which does not give the preferable coordinates. By dividing the two dimensional image into at least two image domains, wherein one image domain comprises a single reflection of the planar beam of light from the object to the capturing means and at least one image domain comprises a reflection of the planar beam of light from at least one reflecting means and by transforming them into a mutual object domain the desirable capturing means coordinates can be obtained. The transformation procedure comprises transforming each scan element with a transformation function adapted for transforming that specific image domain into the mutual object domain. The transformation function can comprise a translational, rotational, and/or scaling transformation. From the mutual object domain a two dimensional cross sectional profile of the image is obtained. By repeating this while the object is being subjected to the planar beam of light and based on the plurality of the two dimensional image in the object domain a three dimensional image is defined. The transformation from the image domains to the mutual object domain can be based on database (look up tables, memory tables) wherein the coordinates of the picture scan elements in the image domains are given new coordinates in accordance with said transformations to the mutual object domain. This may result in higher processing speed than, for example, real-time transformation calculations. The database could for example be obtained in accordance to a specific setup in accordance to the arrangement and location of the reflecting means, the light source and the detecting means relative to each other. If the relative location would change the relative distance could be changed in accordance to the initial setup. The database could also automatically be updated if the internal position of the reflecting means, the light source and the detecting means would change, in accordance to a reference system fixed to the capturing means.

According to another aspect the present invention relates to an apparatus for determining three-dimensional geometrical and surface information of a moving object, the apparatus comprising conveyor for conveying the object while the processing occur, an illumination source that casts a planar beam of light across the object, reflecting means for reflecting the light to the object and to reflected light from the object, capturing means for capturing the light reflected from the object and the reflecting means, the apparatus further comprising a control system being provided with processing means having stored therein a computer program wherein input and output means and means for storing information are being adapted in order to response to determine a three dimensional image, wherein the determination of the three dimensional image comprises means for repetitively capture two dimensional images from the reflecting means and the object, means for repetitively transforming the two dimensional captured images from a image domain into a object domain, from which a three dimensional image is determined.

DETAILED DESCRIPTION OF THE INVENTION

In the following the present invention, and in particular preferred embodiments thereof, will be described in greater details in connection with the accompanying drawings in which FIG. 1a)–FIG. 1b) shows a perspective view of the apparatus according to the present invention.

Figure 1A:
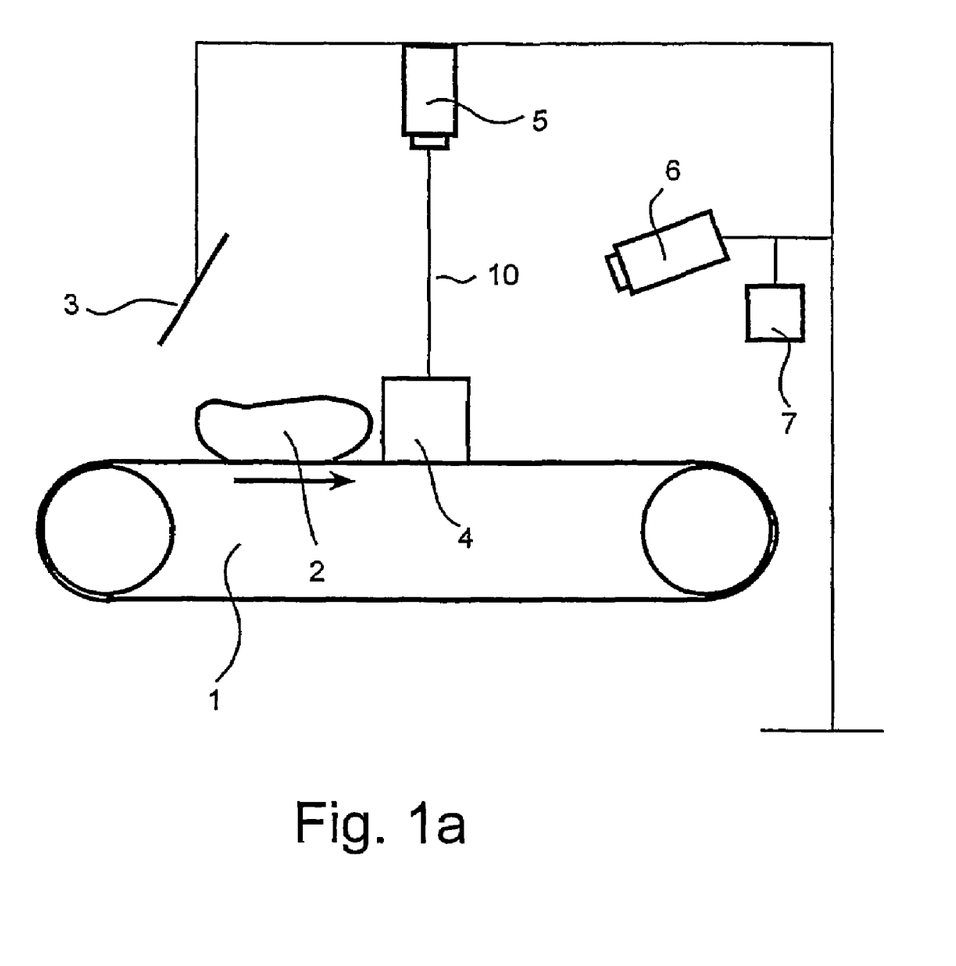
Figure 1B:
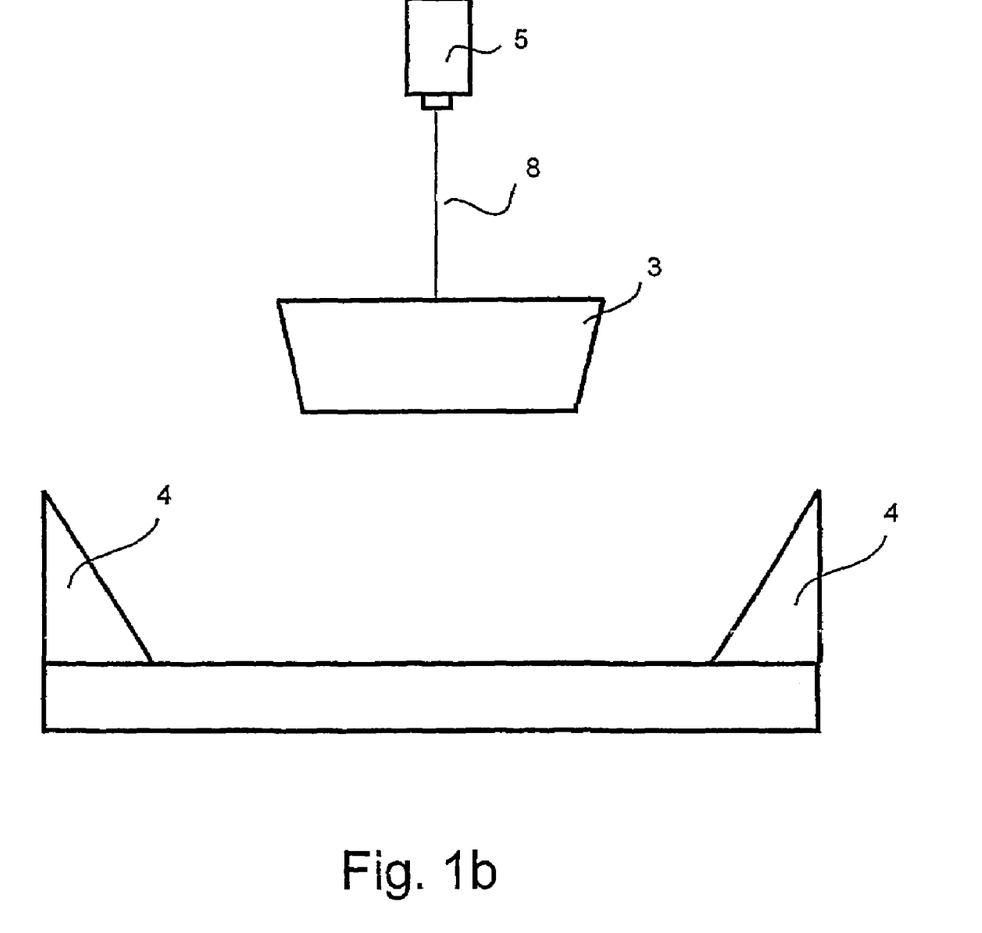

In FIGS. 1a) and 1b) a perspective view of the apparatus according to the present invention is shown, wherein an object 2 is being conveyed by means of conveyor belt 1 in a direction given by the arrow. Illumination source 5 casts a planar beam of light 10 across the conveyer belt and orthogonal to the direction of movement and further on the two side reflecting means 4, preferably mirrors. The illuminating source may be a laser and a cylindrical lens or vibrating mirror for producing a planar beam of light. A capturing means 6 such as a CCD matrix sensor is situated above the conveyor belt and receives a view of practically the entire perimeter through the two reflecting side mirrors, which in this embodiment are left-and right mirrors as shown in FIG. 1b and the back rear window 3. The orientation of the sensor and the left-and right mirrors is such that that the sensor captures the following four views:
a. The surface of the object where it crosses the plane of the illumination line.
b. A left mirror view of the side of the object.
c. A right mirror view of the side of the object.
d. A back rear window view from the surface of the object, which may otherwise not be visible in the direct view. This fourth view fills therefore into the blanks that would otherwise occur if it would not be placed there.

Figure 2:
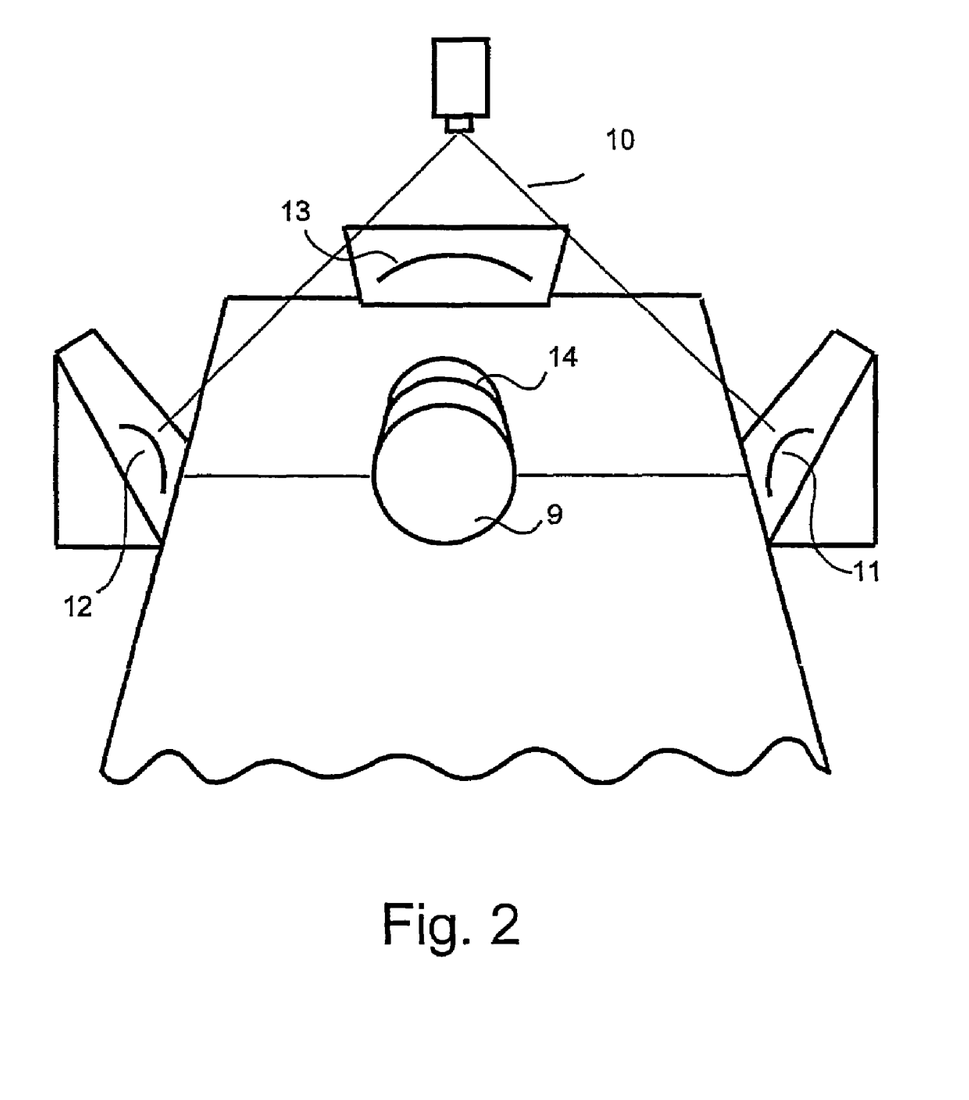
FIG. 2 shows an overview of the apparatus from the detecting means point of view wherein the object is a cylinder.

FIG. 2 shows an example of an cylindrical shaped object 9 being conveyed from the viewpoint of the capturing means at one instant of time. Shown is the reflected image from the first two side mirrors 4, a right side image 11 and left side image 12, the rear back mirror image 13 and reflection from the object 14 as the object enters the planar beam of light 10. The side mirrors serve the purpose that they reflect the illumination line to the sides of the object and to underneath segments that are elevated from the conveyor belt surface and give therefore the sensor a view of these areas. As FIG. 2 shows, half the perimeter of the cylinder is visible, and the other half is detected by the side mirrors. Therefore, the light that hits the surface of the cylinder that is in line of sight from the viewpoint of the capturing means is reflected to the sensor. If on the other hand a part of the surface would not be reflected to the sensor, the use of the back mirror would be preferable.

Figure 3:
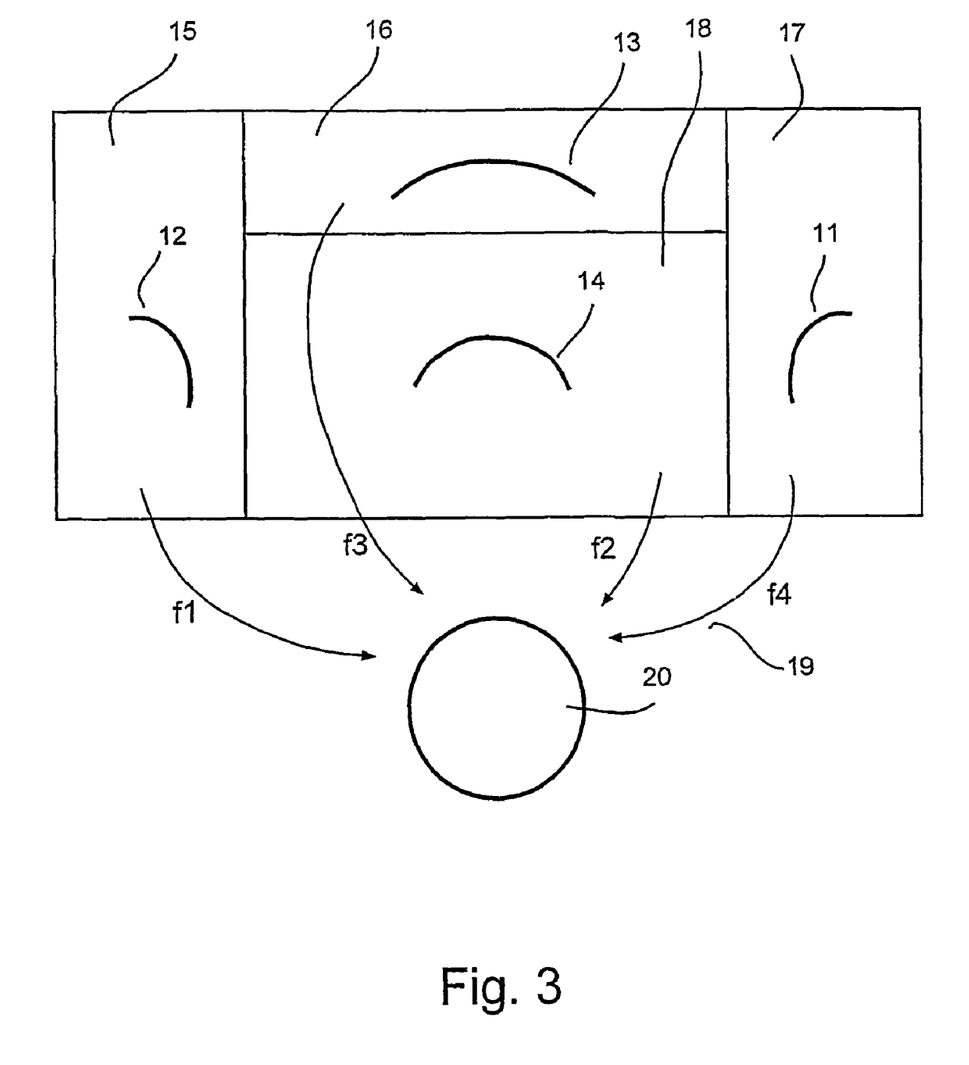
FIG. 3 shows image domains and transformation from the image domains to a mutual object domain for a cylinder.

FIG. 3 shows an image domain, wherein the images from each reflecting means are assigned to a certain domains. The image 12 of the left mirror is assigned to one domain 15, the image 11 of the right mirror is assigned to another domain 17, the image 13 of the back mirror is assigned to the third domain 16 and the image 14 that is reflected to the sensor is assigned to the fourth domain 18. Each of these captured images comprises scan elements, i.e. pixels, based on a reflection of the planar light beam from the object and the mirrors. These scan elements in each domain have a coordinate in accordance with the domain that it is assigned to. By transforming each domain to a mutual object domain by means of transforming procedure 19, a two dimensional image can be defined 20 in a object domain. The transformation procedure can comprise translational, rotational and/ or scaling transformation of the matrix elements from the image domain into the object domain. The transformation from the image domain to the mutual object domain can be based on a database, wherein the coordinates of the picture scan elements in the image domain are given new coordinates in accordance with said transformations to the mutual object domain. The transformation procedure may also comprise a transformation from the image domains into the object domain without using a database, wherein the transformation can be based on the orientation of the reference points relative to the capturing means. For this object, the back rear mirror was not essential because of the reflection toward the capturing means.

After object domain is obtained, endpoints in fourth domain 18 after transformation are obtained and shortest distance to each said endpoint to each transformed endpoints in domain 15 and 17 define matching points and are used to connect the object together. The area for the object can be calculated by summation after these matching points have been found.

The area determination is preferably based on summing up the area of one pixel, which is the width multiplied by the height of the pixel. Volume is therefore obtained by multiplying said area with the image thickness, which depends on the resolution.

Due to limited resolution triangulation method may be used between each height pixel to minimize the volume error.

This image processing is repeated while the object is being subjected to the planar beam of light. Based on a plurality of such two dimensional images in the object domain, a three dimensional image is defined. By varying the processing rate the resolution of the three dimensional image is varied. High processing rate would lead to high resolution of the images and conversely.

Figure 4:
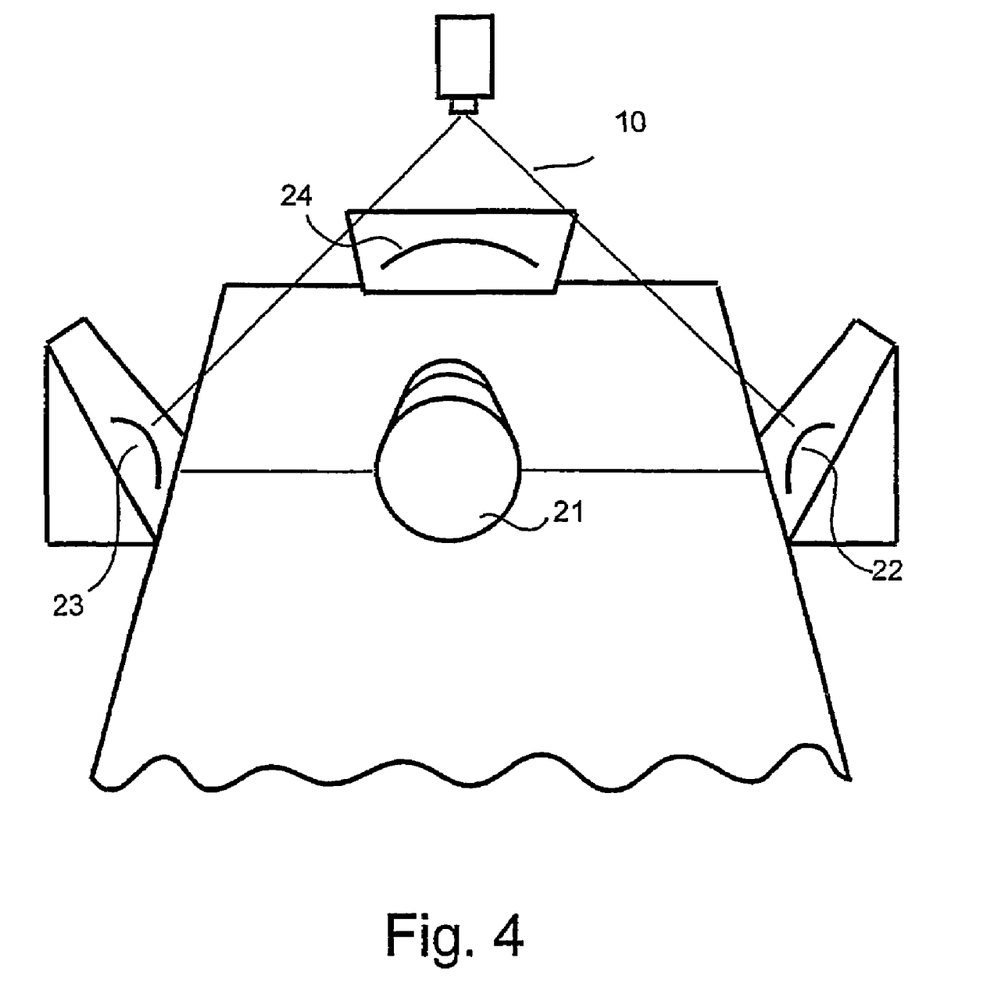
FIG. 4 shows an overview of the apparatus from the detecting means point of view wherein the object is a cone shaped object.
Figure 5:
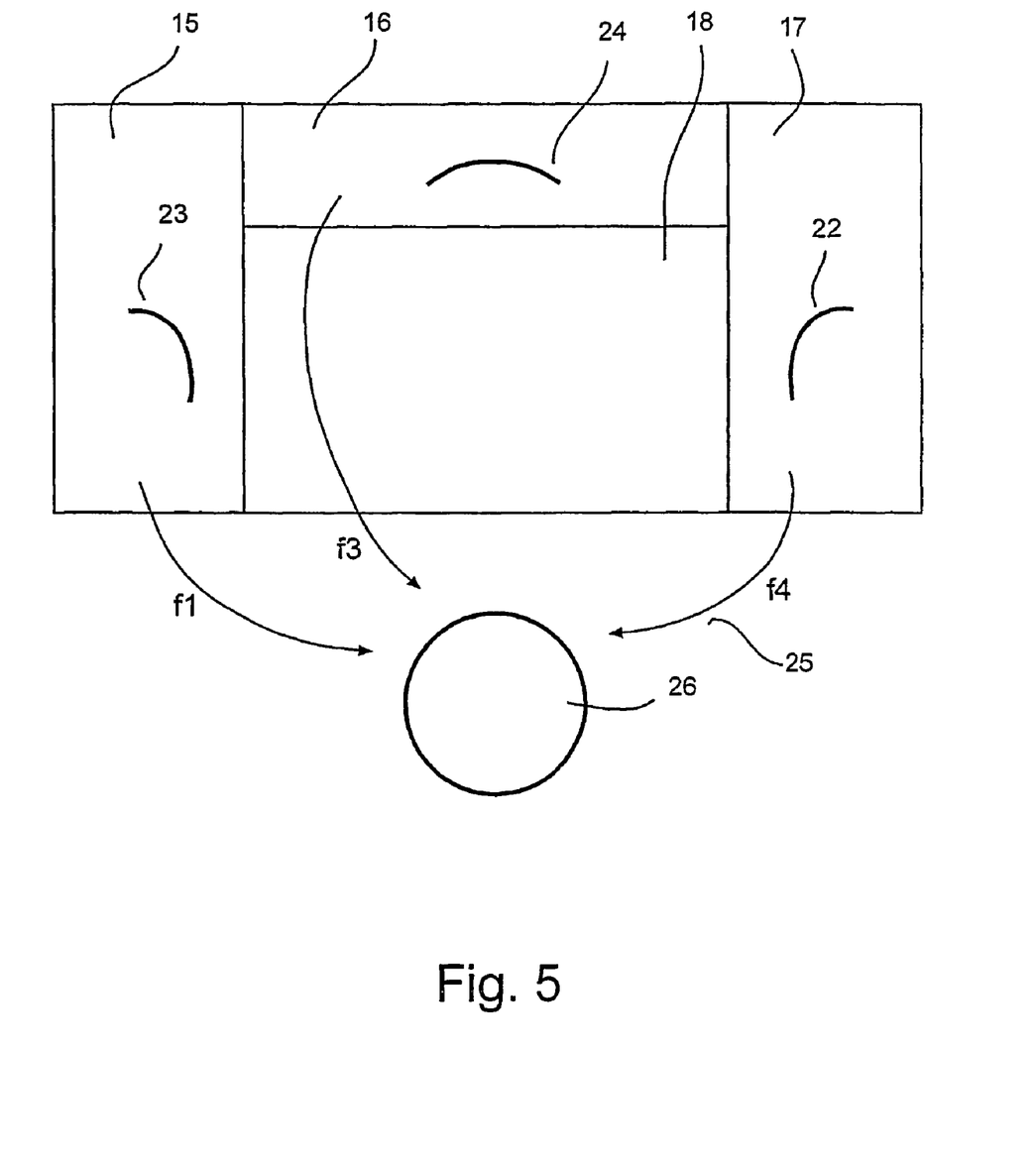
FIG. 5 shows a image domains and transformation from the image domains to a mutual object domain for the cone shaped object.

FIG. 4 shows an example of an conical object 21 being conveyed, wherein the end with the larger radius is facing the sensor. Shown is the reflected image from the left side mirror 23, the right side mirror 22 and the back mirror 24. In FIG. 5 image domains from each reflecting means are shown. As before the image of the left mirror 23 is assigned to one domain 15, the image of the right mirror 22 is assigned to another domain 17, the image of the back mirror 24 is assigned to the third domain but due to the conical shape of the object the image domain of the direct view to the sensor 18 is empty, where we have assumed that no reflection from the surface is detected directly by the sensor. In this case the role of the back mirror is necessary in order to enable a definition of the two dimensional image in the object domain. The transformation procedure 25 from the image domains to the mutual object domain would therefore define the object. By repeating the image processing a plurality of two dimensional image in the object domain would define a three dimensional image.

Figure 6:
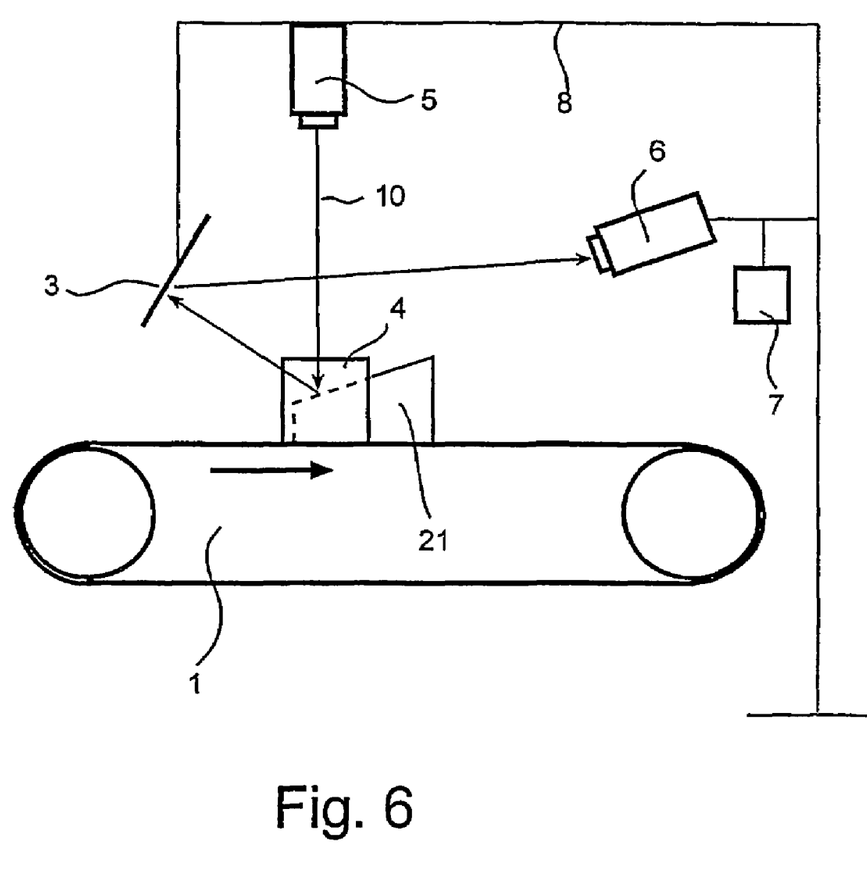
FIG. 6 shows a overview of the cone shaped object, FIGS. 7a) and 7b) shows two perspective views for a cone shaped object after repeating the image processing of the two dimensional image while the object enters the planar beam of light.

FIG. 6 shows a side view of the conical object 21 shown in FIG. 5 as it is being conveyed 1. As the object enters the planar beam of light 10 from the light source 5, the processing start. No light is reflected from the object to the sensor 6. However, from the back mirror 3, the surface of the object can be detected from the reflection from the surface from the object to the back mirror 3, and from the back mirror to the sensor. Therefore half the perimeter of the object is detected by the back mirror and the other half by the side mirrors 4. By means of transformation procedure, a processor 7 is used to transforme the data from the image domains to a mutual object domains.

Figure 7A:
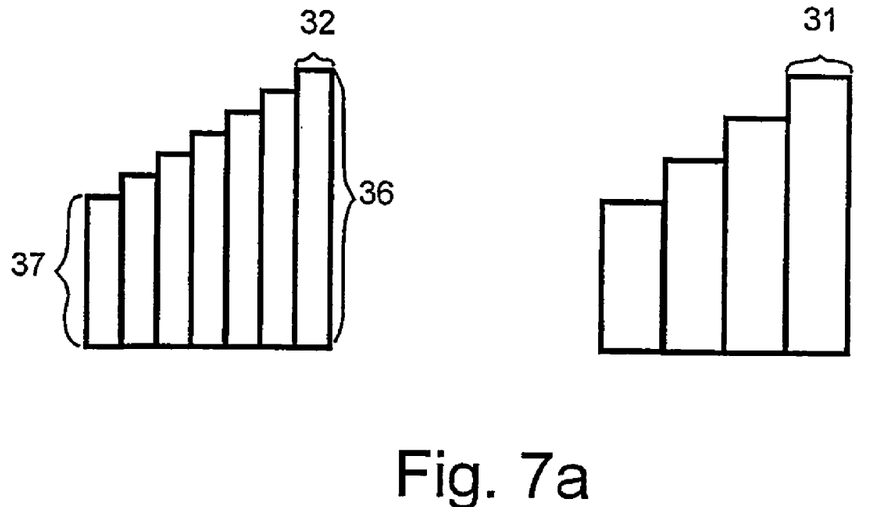
Figure 7B:
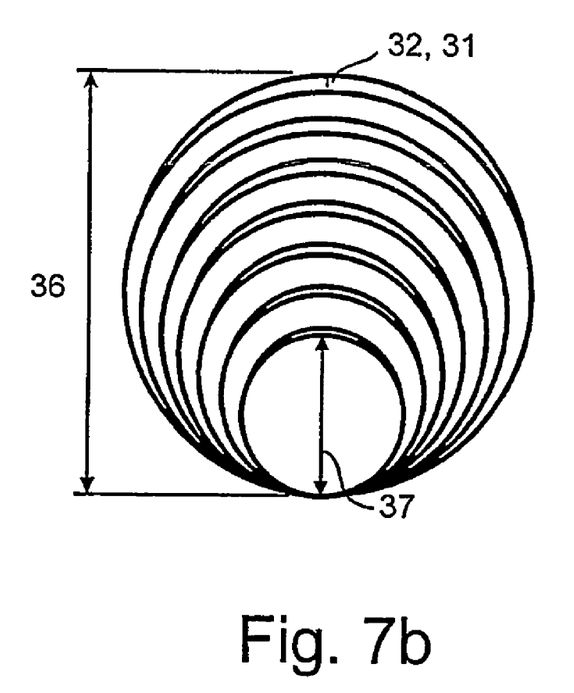

FIGS. 7a) and 7b) shows two perspective views for a conical shaped object after repeating the image processing of the two dimensional image while the object enters the planar beam of light. The result is a number of cylinders wherein the radius increases in discrete steps from the lowest diameter 37 up to the highest diameter 36. FIG. 7a) shows an example of two different processing speeds, which is reflected in different height of the cylinder 32, 31. As the processing speed is increased, the accuracy of the volume determination of the object increases 28 and the height of each cylinder decreases 32, compared to lower processing speed, where the height of each cylinder is larger 31. The front view in FIG. 7b) shows a number of cylinders with diameters $D_1$ and height $d_1$, wherein the height $d_i$ (32,31) is directly related to the processing speed. Accordingly, the diameter of the first circle 37 corresponds to the minimum height in FIG. 7a) 37 and the radius of the largest circle 36 corresponds to the maximum height.

Figure 8:
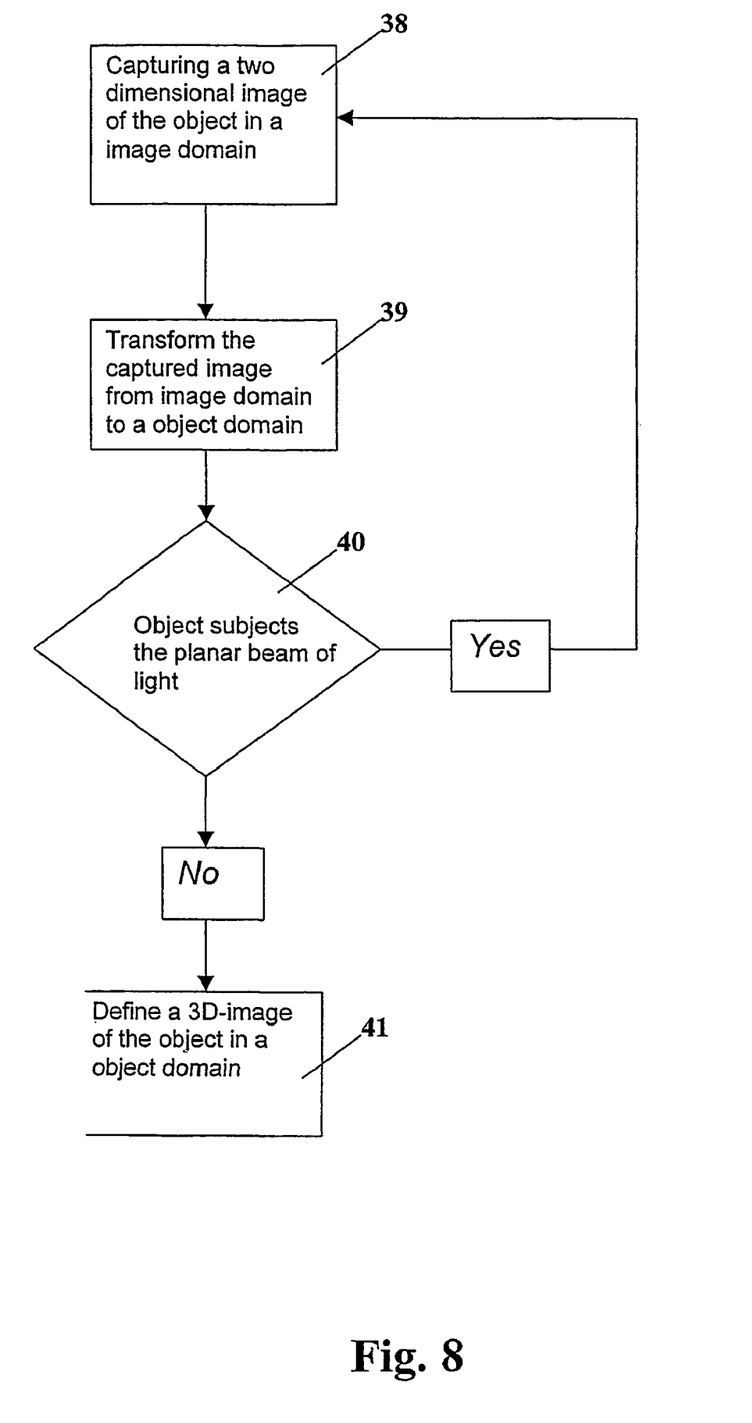
FIG. 8 shows a Flow Diagram from when the object enters until the object leaves the planar beam of light.

FIG. 8 shows a Flow Diagram from an object entering a planar beam of light until the it leaves the planar beam of light. Initially, the amount of processing is minimal and thus the scan frequency can be maximal. In this moment the image may consist of a straight line until the object enters the light. Then as soon as the object enters the planar beam of light 10, the processing speed increases and the scanning frequency can be decreased to a set value as the capturing of two dimensional images in a image domain starts 38. A processor transforms the data from image domain where the images are captured to an object domain 39 which forms a two dimensional image. This is repeated while the object enters the light 40. Soon as the object does not subject the light, a complete 3D image in the object domain can be constructed.

Figure 9:
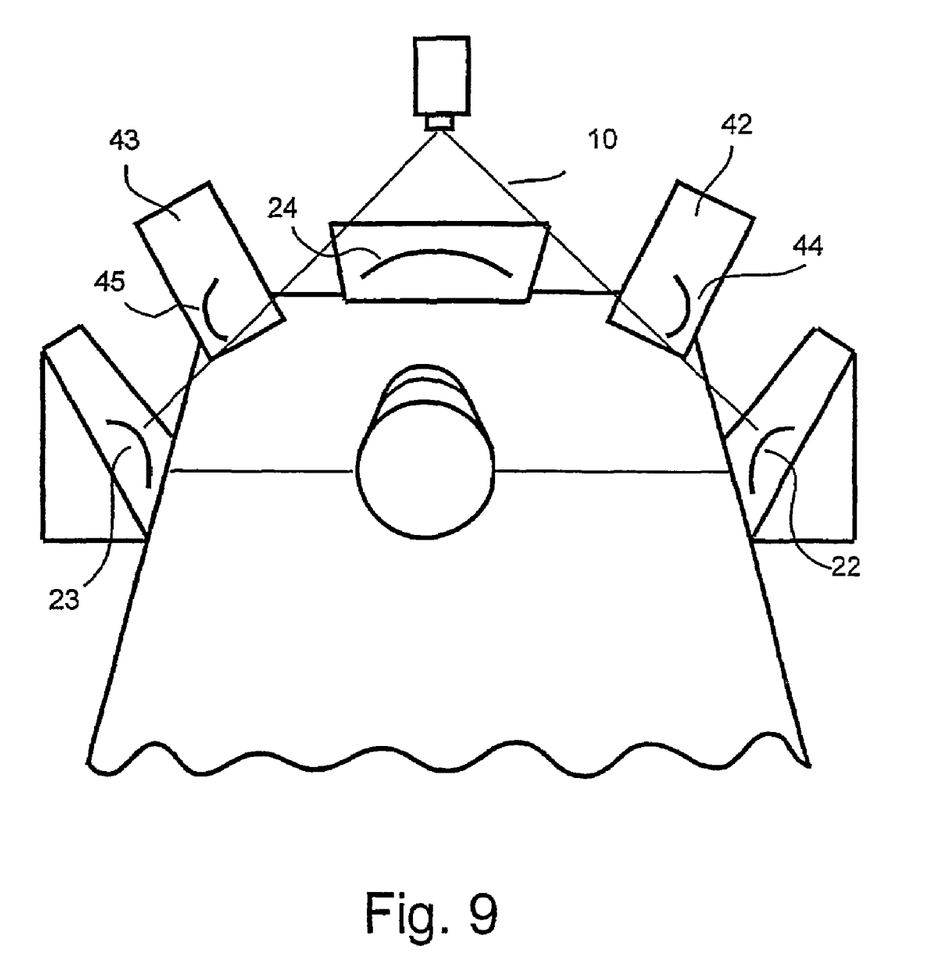
FIG. 9 shows a preferred embodiment of the invention where two additional side mirrors have been added to the two first side mirrors.

FIG. 9 shows an example of the most preferably embodiment of the invention where two additional second side mirrors 42,43 have been added to the two first side mirrors 22,23. The distance between the two second side mirrors is shorter than between the first two side mirror. By using such arrangement the viewing angle of the capturing means is lowered and the efficiency in the performance in the capturing means is increased. Furthermore the capturing means can be positioned closer to the reflecting means and the light source. The two second side mirrors will furthermore be positioned so that the side view image of the object from the two first side mirrors is viewed in the two second side mirrors 44,45, from which it is captured by the capturing means.

The invention claimed is:

1. A method for determining a three dimensional image of a moving object, the method comprising the steps of, repetitively:
   capturing a two dimensional image of the object with a capturing means, the captured image comprising a scan element based on a reflection of a planar beam of light from the object and a scan element based on a reflection of the planar beam of light from the object, further reflected from a plurality reflecting means,
   dividing the two dimensional image into at least two image domains, wherein one image domain comprises a reflection of the planar beam of light from the object and at least one image domain comprises a reflection of the planar beam of light from the at least one reflecting means, and
   transforming the image domains into a two dimensional mutual object domain by means of a transformation procedure, while the object is being subjected to the planar beam of light and based on the plurality of the two dimensional images in the objects domain, defining a three dimensional image, and
   storing the images in a computer system,
   wherein the reflecting means comprise at least one side and at least one back mirror adapted to view side and top image parts of the object, and
   wherein the mutual object domain gives the coordinates of the two dimensional cross sectional profile of the image.

2. The method according to claim 1, wherein the transformation of the image domains into a mutual object domain comprises transforming each scan element in the image domain with a transformation function adapted for transforming that specific image domain into the mutual object domain.

3. The method according to claim 1, wherein the transformation function comprises translational transformation.

4. The method according to claim 1 wherein the transformation function comprises rotational transformation.

5. The method according to claim 1 wherein the transformation function comprises scaling transformation.

6. The method according to claim 1, wherein the planar beam of light is situated above the moving object and wherein the plane of the beam light is perpendicular to the moving direction of the object.

7. The method according to claim 1, wherein the reflecting side of said at least one back mirror is positioned perpendicular to the moving direction of the object.

8. The method according to claim 1, wherein said at least one side mirror is positioned parallel to the moving direction of the object.

9. The method according to claim 1, wherein the light source, the capturing means, said least one side mirror and said least one back mirror are assembled and mounted as a one unit in a fixed position, wherein said at least one first side mirror is situated between the capturing means and said at least one back mirror.

10. The method according to claim 1 wherein the moving means is a conveyor belt.

11. A method for determining a three dimensional image of a moving object, the method comprising the steps of, repetitively:
   capturing a two dimensional image of the object with a capturing means, the captured image comprising a scan element based on a reflection of a planar beam of light from the object and a scan element based on a reflection of the planar beam of light from the object, further reflected from a plurality reflecting means,
   dividing the two dimensional image into at least two image domains, wherein one image domain comprises a reflection of the planar beam of light from the object and at least one image domain comprises a reflection of the planar beam of light from the at least one reflecting means, and
   transforming the image domains into a two dimensional mutual object domain by means of a transformation procedure, while the object is being subjected to the planar beam of light and based on the plurality of the two dimensional images in the objects domain, defining a three dimensional image, and
   storing the images in a computer system,
   wherein the reflecting means comprise at least one side and at least one back mirror adapted to view side and top image parts of the object, and wherein the transformation from the image domains to the mutual object domain, is based on database wherein the coordinates of the picture scan elements in the image domains are given new coordinates in accordance with said transformations to the mutual object domain.

12. A method for determining a three dimensional image of a moving object, the method comprising the steps of, repetitively:
capturing a two dimensional image of the object with a capturing means, the captured image comprising a scan element based on a reflection of a planar beam of light from the object and a scan element based on a reflection of the planar beam of light from the object, further reflected from a plurality reflecting means,
dividing the two dimensional image into at least two image domains, wherein one image domain comprises a reflection of the planar beam of light from the object and at least one image domain comprises a reflection of the planar beam of light from the at least one reflecting means, and
transforming the image domains into a two dimensional mutual object domain by means of a transformation procedure,
while the object is being subjected to the planar beam of light and based on the plurality of the two dimensional images in the objects domain, defining a three dimensional image, and
storing the images in a computer system,
wherein the reflecting means comprise at least one side and at least one back mirror adapted to view side and top image parts of the object, and
wherein the at least one back mirror is a single rear back mirror situated opposite the capturing means and above the moving object.

13. A method for determining a three dimensional image of a moving object, the method comprising the steps of, repetitively:
capturing a two dimensional image of the object with a capturing means, the captured image comprising a scan element based on a reflection of a planar beam of light from the object and a scan element based on a reflection of the planar beam of light from the object, further reflected from a plurality reflecting means,
dividing the two dimensional image into at least two image domains, wherein one image domain comprises a reflection of the planar beam of light from the object and at least one image domain comprises a reflection of the planar beam of light from the at least one reflecting means, and
transforming the image domains into a two dimensional mutual object domain by means of a transformation procedure,
while the object is being subjected to the planar beam of light and based on the plurality of the two dimensional images in the objects domain, defining a three dimensional image, and
storing the images in a computer system,
wherein the reflecting means comprise at least one side and at least one back mirror adapted to view side and top image parts of the object, and
wherein the at least one side mirror is positioned along to the moving direction of the object and in the plane of the planar beam of light so that light is reflected from the mirror to the object and back to the mirror thereby allowing the side view image of the object which are otherwise not detectable by the capturing means to be detectable.

14. A method for determining a three dimensional image of a moving object, the method comprising the steps of, repetitively:
capturing a two dimensional image of the object with a capturing means, the captured image comprising a scan element based on a reflection of a planar beam of light from the object and a scan element based on a reflection of the planar beam of light from the object, further reflected from a plurality reflecting means,
dividing the two dimensional image into at least two image domains, wherein one image domain comprises a reflection of the planar beam of light from the object and at least one image domain comprises a reflection of the planar beam of light from the at least one reflecting means, and
transforming the image domains into a two dimensional mutual object domain by means of a transformation procedure,
while the object is being subjected to the planar beam of light and based on the plurality of the two dimensional images in the objects domain, defining a three dimensional image, and
storing the images in a computer system,
wherein the reflecting means comprise at least one side and at least one back mirror adapted to view side and top image parts of the object, and
wherein the frequency of capturing a two dimensional image is controlled by the capturing means in a way that when no profile image is detected the image processing is minimal and the scan frequency is maximal.

15. A method for determining a three dimensional image of a moving object, the method comprising the steps of, repetitively:
capturing a two dimensional image of the object with a capturing means, the captured image comprising a scan element based on a reflection of a planar beam of light from the object and a scan element based on a reflection of the planar beam of light from the object, further reflected from a plurality reflecting means,
dividing the two dimensional image into at least two image domains, wherein one image domain comprises a reflection of the planar beam of light from the object and at least one image domain comprises a reflection of the planar beam of light from the at least one reflecting means, and
transforming the image domains into a two dimensional mutual object domain by means of a transformation procedure,
while the object is being subjected to the planar beam of light and based on the plurality of the two dimensional images in the objects domain, defining a three dimensional image, and
storing the images in a computer system,
wherein the reflecting means comprise at least one side and at least one back mirror adapted to view side and top image parts of the object, and
wherein from the three dimensional image the total volume of the object is calculated.

16. A method for determining a three dimensional image of a moving object, the method comprising the steps of, repetitively:
capturing a two dimensional image of the object with a capturing means, the captured image comprising a scan element based on a reflection of a planar beam of light from the object and a scan element based on a reflection of the planar beam of light from the object, further reflected from a plurality reflecting means, dividing the two dimensional image into at least two image domains, wherein one image domain comprises a reflection of the planar beam of light from the object and at least one image domain comprises a reflection of the planar beam of light from the at least one reflecting means, and transforming the image domains into a two dimensional mutual object domain by means of a transformation procedure, while the object is being subjected to the planar beam of light and based on the plurality of the two dimensional images in the objects domain, defining a three dimensional image, and storing the images in a computer system, wherein the reflecting means comprise at least one side and at least one back mirror adapted to view side and top image parts of the object, and wherein, by weighing the object and by using information relating to a total volume of the object, a mass distribution is determined.

17. A method for determining a three dimensional image of a moving object, the method comprising the steps of, repetitively:

capturing a two dimensional image of the object with a capturing means, the captured image comprising a scan element based on a reflection of a planar beam of light from the object and a scan element based on a reflection of the planar beam of light from the object, further reflected from a plurality reflecting means, dividing the two dimensional image into at least two image domains, wherein one image domain comprises a reflection of the planar beam of light from the object and at least one image domain comprises a reflection of the planar beam of light from the at least one reflecting means, and transforming the image domains into a two dimensional mutual object domain by means of a transformation procedure, while the object is being subjected to the planar beam of light and based on the plurality of the two dimensional images in the objects domain, defining a three dimensional image, and storing the images in a computer system, wherein the reflecting means comprise at least one side and at least one back mirror adapted to view side and top image parts of the object, and wherein a mass distribution is used for cutting the object.

18. A method for determining a three dimensional image of a moving object, the method comprising the steps of, repetitively:

capturing a two dimensional image of the object with a capturing means, the captured image comprising a scan element based on a reflection of a planar beam of light from the object and a scan element based on a reflection of the planar beam of light from the object, further reflected from a plurality reflecting means, dividing the two dimensional image into at least two image domains, wherein one image domain comprises a reflection of the planar beam of light from the object and at least one image domain comprises a reflection of the planar beam of light from the at least one reflecting means, and transforming the image domains into a two dimensional mutual object domain by means of a transformation procedure, while the object is being subjected to the planar beam of light and based on the plurality of the two dimensional images in the objects domain, defining a three dimensional image, and storing the images in a computer system, wherein the reflecting means comprise at least one side and at least one back mirror adapted to view side and top image parts of the object, and wherein the purity of contour line obtained from the two-dimensional profile image of the object is used as an indicator for the surface roughness of the object.

19. A method for determining a three dimensional image of a moving object, the method comprising the steps of, repetitively:

capturing a two dimensional image of the object with a capturing means, the captured image comprising a scan element based on a reflection of a planar beam of light from the object and a scan element based on a reflection of the planar beam of light from the object, further reflected from a plurality reflecting means, dividing the two dimensional image into at least two image domains, wherein one image domain comprises a reflection of the planar beam of light from the object and at least one image domain comprises a reflection of the planar beam of light from the at least one reflecting means, and transforming the image domains into a two dimensional mutual object domain by means of a transformation procedure, while the object is being subjected to the planar beam of light and based on the plurality of the two dimensional images in the objects domain, defining a three dimensional image, and storing the images in a computer system, wherein the reflecting means comprise at least one side and at least one back mirror adapted to view side and top image parts of the object, and wherein the capturing means comprises means for capturing colour and wherein the colour is used as an indicator for fat content and/or muscle content and/or water content and/or chemical composition.

20. An apparatus for determining a three dimensional image of an moving object, the apparatus comprising:

a conveyor for conveying the object a plurality of reflecting means, capturing means for capturing a two dimensional image of the object while the object is being conveyed, the captured image comprising a scan element based on a reflection of a planar beam of light from the object and a scan element based on a reflection of the planar beam of light from the object, further reflected from the reflecting means, a computer system for storing the captured images and for dividing the two dimensional image into at least two image domains, wherein one image domain comprises a reflection of the planar beam of light from the object and at least one image domain comprises a reflection of the planar beam of light from the least one reflecting means and for transforming the image domains into a two dimensional mutual object domain by means of a transformation procedure while the object is being subjected to the planar beam of light and based on the plurality of the two dimensional images in the object domain generating a three dimensional image of the object, wherein the reflecting means comprises at least one side and at least one back mirror adapted to view side and top image parts of the object, and wherein the mutual object domain gives the coordinates of the two dimensional cross sectional profile of the image.

21. A method for determining a three dimensional image of a moving object, the method comprising the steps of, repetitively:

capturing a two dimensional image of the object with a capturing means, the captured image comprising a scan element based on a reflection of a planar beam of light from the object and a scan element based on a reflection of the planar beam of light from the object, further reflected from a plurality reflecting means, dividing the two dimensional image into at least two image domains, wherein one image domain comprises a reflection of the planar beam of light from the object and at least one image domain comprises a reflection of the planar beam of light from the at least one reflecting means, and transforming the image domains into a two dimensional mutual object domain by means of a transformation procedure, while the object is being subjected to the planar beam of light and based on the plurality of the two dimensional images in the objects domain, defining a three dimensional image, and storing the images in a computer system, wherein the reflecting means comprise at least one side and at least one back mirror adapted to view side and top image parts of the object, and wherein the mass distribution is used for cutting the object in accordance to predefined criteria, and wherein said criteria is based on the speed on the moving means and the mass distribution.

* * * * *